US012433649B2

(12) United States Patent
Taylor et al.

(10) Patent No.: US 12,433,649 B2
(45) Date of Patent: Oct. 7, 2025

(54) SYSTEMS AND METHODS FOR A SMART, IMPLANTABLE CRANIO-MAXILLO-FACIAL DISTRACTOR

(71) Applicants: THE TRUSTEES OF THE UNIVERSITY OF PENNSYLVANIA, Philadelphia, PA (US); CHILDREN'S HOSPITAL OF PHILADELPHIA, Philadelphia, PA (US)

(72) Inventors: Jesse Taylor, Gladwyne, PA (US); Ari Wes, Philadelphia, PA (US)

(73) Assignees: THE TRUSTEES OF THE UNIVERSITY OF PENNSYLVANIA, Philadelphia, PA (US); CHILDREN'S HOSPITAL OF PHILADELPHIA, Philadelphia, PA (US)

( * ) Notice: Subject to any disclaimer, the term of this patent is extended or adjusted under 35 U.S.C. 154(b) by 898 days.

(21) Appl. No.: 17/430,518

(22) PCT Filed: Feb. 12, 2020

(86) PCT No.: PCT/US2020/017918
§ 371 (c)(1),
(2) Date: Aug. 12, 2021

(87) PCT Pub. No.: WO2020/167940
PCT Pub. Date: Aug. 20, 2020

(65) Prior Publication Data
US 2022/0125493 A1 Apr. 28, 2022

Related U.S. Application Data

(60) Provisional application No. 62/804,955, filed on Feb. 13, 2019.

(51) Int. Cl.
*A61B 17/80* (2006.01)
*A61B 17/00* (2006.01)
(Continued)

(52) U.S. Cl.
CPC ........ *A61B 17/8019* (2013.01); *A61B 17/663* (2013.01); *A61B 2017/00221* (2013.01);
(Continued)

(58) Field of Classification Search
CPC .............. A61B 17/8019; A61B 17/663; A61B 2017/00221; A61B 2017/00411; A61B 2017/00876; A61B 2017/564
See application file for complete search history.

(56) References Cited

U.S. PATENT DOCUMENTS 5,540,687 A 7/1996 Fairley et al.
5,993,448 A 11/1999 Remmler
(Continued)

FOREIGN PATENT DOCUMENTS

WO WO 2008/003952 A1 1/2008
WO WO 2017/083869 A1 5/2017
WO WO-2018165243 A1 * 9/2018 ........... A61B 17/663

OTHER PUBLICATIONS

Extended European Search Report dated Oct. 27, 2022 in Application No. EP 20754914.
(Continued)

Primary Examiner — Zade Coley
Assistant Examiner — Diana Jones
(74) Attorney, Agent, or Firm — Baker Botts L.L.P.

(57) ABSTRACT

Systems and methods for improved cranio-maxillo-facial distraction are provided. The disclosed subject matter can include a distraction device adapted for subcutaneous implantation in a patient, and a handheld device operationally coupled to the distraction device. The distraction device can include a distraction element, adapted to attach to opposing bony fragments of a bone and perform distraction osteogenesis on the bone, and a rotatable magnetic element, coupled to the distraction element such that rotation of the
(Continued)

magnetic element controls the distraction element. The handheld device can include a magnetic element, operationally coupled to and magnetically aligned with the magnetic element of the distraction device, such that rotation of the magnetic element of the handheld device causes corresponding rotation of the magnetic element of the distraction device. The disclosed subject matter also provides techniques for implanting a distraction device to opposing bony fragments of a bone and using such a device.

9 Claims, 7 Drawing Sheets

(51) Int. Cl.
*A61B 17/56* (2006.01)
*A61B 17/66* (2006.01)
(52) U.S. Cl.
CPC ............ *A61B 2017/00398* (2013.01); *A61B 2017/00411* (2013.01); *A61B 2017/00876* (2013.01); *A61B 2017/564* (2013.01)

(56) References Cited

U.S. PATENT DOCUMENTS

| | | | |
|---|---|---|---|
| 6,113,599 A * | 9/2000 | Landsberger | A61B 17/663 606/57 |
| 6,290,724 B1 | 9/2001 | Marino | |
| 7,776,094 B2 | 8/2010 | McKinley et al. | |
| 7,862,502 B2 | 1/2011 | Pool et al. | |
| 7,955,357 B2 | 6/2011 | Kiester | |
| 7,981,025 B2 | 7/2011 | Pool et al. | |
| 8,057,472 B2 | 11/2011 | Walker et al. | |
| 8,197,490 B2 | 6/2012 | Pool et al. | |
| 8,246,533 B2 | 8/2012 | Chang et al. | |
| 8,343,192 B2 | 1/2013 | Kiester | |
| 8,382,756 B2 | 2/2013 | Pool et al. | |
| 8,419,734 B2 | 4/2013 | Walker et al. | |
| 8,449,543 B2 | 5/2013 | Pool et al. | |
| 8,715,159 B2 | 5/2014 | Pool et al. | |
| 8,715,282 B2 | 5/2014 | Pool | |
| 8,734,488 B2 | 5/2014 | Pool et al. | |
| 8,808,163 B2 | 8/2014 | Pool et al. | |
| 8,852,187 B2 | 10/2014 | Pool et al. | |
| 8,852,236 B2 | 10/2014 | Kiester | |
| 8,974,463 B2 | 3/2015 | Pool et al. | |
| 9,011,499 B1 | 4/2015 | Kiester | |
| 9,044,281 B2 | 6/2015 | Pool et al. | |
| 9,078,711 B2 | 7/2015 | Quick | |
| 9,179,938 B2 | 11/2015 | Pool et al. | |
| 9,179,960 B2 | 11/2015 | Walker et al. | |
| 9,186,183 B2 | 11/2015 | Pool et al. | |
| 9,192,411 B2 | 11/2015 | Pool et al. | |
| 9,198,755 B2 | 12/2015 | Shaolian et al. | |
| 9,248,043 B2 | 2/2016 | Payne et al. | |
| 9,271,781 B2 | 3/2016 | Walker et al. | |
| 9,271,857 B2 | 3/2016 | Pool et al. | |
| 9,393,117 B2 | 7/2016 | Pool | |
| 9,393,119 B2 | 7/2016 | Pool et al. | |
| 9,398,925 B2 | 7/2016 | Kiester | |
| 9,421,046 B2 | 8/2016 | Pool et al. | |
| 9,526,650 B2 | 12/2016 | Pool et al. | |
| 9,622,792 B2 | 4/2017 | Pool et al. | |
| 9,693,813 B2 | 7/2017 | Walker et al. | |
| 9,730,612 B2 | 8/2017 | Quick | |
| 9,757,159 B2 | 9/2017 | Pool et al. | |
| 9,770,274 B2 | 9/2017 | Pool et al. | |
| 9,848,914 B2 | 12/2017 | Pool et al. | |
| 9,883,910 B2 * | 2/2018 | Conlon | A61B 90/13 |
| 10,004,537 B2 | 6/2018 | Pool et al. | |
| 10,016,220 B2 | 7/2018 | Culbert | |
| 10,016,221 B2 | 7/2018 | Kiester | |
| 10,039,661 B2 | 8/2018 | Pool et al. | |
| 10,076,413 B2 | 9/2018 | Shaolian et al. | |
| 10,105,167 B2 | 10/2018 | Pool | |
| 10,130,405 B2 | 11/2018 | Skinlo et al. | |
| 10,226,242 B2 | 3/2019 | Roschak et al. | |
| 10,238,427 B2 | 3/2019 | Wentz et al. | |
| 10,265,101 B2 | 4/2019 | Culbert et al. | |
| 10,271,885 B2 | 4/2019 | Quach et al. | |
| 10,314,619 B2 | 6/2019 | Roschak et al. | |
| 10,349,982 B2 | 7/2019 | Culbert | |
| 10,349,995 B2 | 7/2019 | Walker et al. | |
| 10,463,406 B2 | 11/2019 | Chang et al. | |
| 10,517,643 B2 | 12/2019 | Pool et al. | |
| 10,617,453 B2 | 4/2020 | Beckett et al. | |
| 10,646,262 B2 | 5/2020 | Pool | |
| 10,660,675 B2 | 5/2020 | Payne et al. | |
| 10,729,470 B2 | 8/2020 | Pool et al. | |
| 10,743,794 B2 | 8/2020 | Pool | |
| 10,751,094 B2 | 8/2020 | Green et al. | |
| 10,835,290 B2 | 11/2020 | Cheng et al. | |
| 10,918,425 B2 | 2/2021 | Schwardt et al. | |
| 2006/0074448 A1 | 4/2006 | Harrison et al. | |
| 2006/0079897 A1 * | 4/2006 | Harrison | A61B 17/66 606/1 |
| 2009/0112262 A1 * | 4/2009 | Pool | A61B 17/68 606/246 |
| 2015/0374444 A1 | 12/2015 | Conlon et al. | |
| 2016/0183994 A1 * | 6/2016 | Quach | A61B 17/8866 606/90 |
| 2017/0333080 A1 | 11/2017 | Roschak et al. | |
| 2018/0353215 A1 | 12/2018 | Cheng et al. | |
| 2018/0360497 A1 | 12/2018 | Strozyk et al. | |

OTHER PUBLICATIONS

International Search Report mailed May 11, 2020 in International Application No. PCT/US20/17918.

* cited by examiner

SYSTEMS AND METHODS FOR A SMART, IMPLANTABLE CRANIO-MAXILLO-FACIAL DISTRACTOR

CROSS-REFERENCE TO RELATED APPLICATIONS

This application is a U.S. National Stage Patent Application under 35 U.S.C. § 371 of International Application No. PCT/US2020/017918, filed on Feb. 12, 2020, which claims priority from U.S. Provisional Patent No. 62/804,955, filed Feb. 13, 2019, the contents of which are incorporated by reference herein in their entirety.

BACKGROUND

Distraction osteogenesis is a technique of bone lengthening which uses the bone's natural healing process. Certain techniques generate new bone at the site of a surgical boney cut by slowly separating plates attached to two opposing bony fragments, thereby correcting growth restriction of the skull and mandible.

Cranio-maxillo-facial distraction can utilize a semi-buried component that protrudes through the skin to allow for manual engagement of the distractor over the course of multiple weeks. Such an external component can predispose the patient to morbidity such as soft-tissue infection, patient and/or parent noncompliance, patient discomfort and/or increased analgesic use throughout the distraction period, as well as unfortunate scarring. In addition to increased morbidity, the manual method by which distractors are engaged can eliminate the possibility of monitoring and recording feedback during the distraction process to detect deviations from the prescribed distraction metrics and diagnose common complications of distraction.

Accordingly, there exists a need for a technique for performing cranio-maxillo-facial distraction that can monitor and record feedback during the distraction process. Additionally, there remains a need for fully implantable distractor that does not protrude through the skin and can be engaged by externals components that are completely outside the patient.

SUMMARY

Systems and methods for improved cranio-maxillo-facial distraction are disclosed herein.

The disclosed subject matter can include a distraction device adapted for subcutaneous implantation in a patient, and a handheld device operationally coupled to the distraction device.

The distraction device can include a distraction element, adapted to attach to opposing bony fragments of a bone and perform distraction osteogenesis on the bone, and a rotatable magnetic element, coupled to the distraction element such that rotation of the magnetic element controls the distraction element. In some embodiments, the rotatable magnetic element can be configured to be diametrically poled. In some embodiments, the distraction device can include an electronic element communicatively coupled to a microprocessor of the handheld device, wherein the electronic element is adapted to count one or more rotations of the rotatable magnetic element, thereby determining a distance of distraction.

The handheld device can also include a magnetic element, operationally coupled to and magnetically aligned with the magnetic element of the distraction device, such that rotation of the magnetic element of the handheld device causes corresponding rotation of the magnetic element of the distraction device. The magnetic element can be configured to rotate based on one or more distraction parameters. In some embodiments, the magnetic element can be configured to preserve torque-generating capabilities when there is magnetic misalignment with the magnetic element of the distraction device. In some embodiments, the magnetic element can comprise at least two magnets, wherein a first magnet and a second magnet are configured to have opposite polarities.

The handheld device can further include a motor, coupled to the magnetic element of the handheld device, for causing rotation thereof. The handheld device microprocessor can be configured to control the motor based on distraction parameters. In some embodiments, the handheld device can include a rotatable screw cap, wherein rotation thereof adjusts the distance between the magnetic element of the handheld device relative to the magnetic element of the distraction device. In some embodiments, the handheld device can include at least one of a button and a lever, adapted to initiate the magnetic element of the handheld device. In some embodiments, the handheld device can include a light element, adapted to alert the patient when distraction is scheduled to occur, and a sound element, adapted to alert the patient when distraction is scheduled to occur. In some embodiments, the light element is further adapted to assist the patient in steering the handheld device into magnetic alignment with the distraction device. In some embodiments, the sound element is further adapted to alert the patient as to any deviations from the distraction parameters. In some embodiments, the handheld device can be configured to preserve torque-generating capabilities when there is magnetic misalignment with the magnetic element of the distraction device.

In some embodiments, the disclosed subject matter can include a user device, adapted to change and transmit distraction parameters to the microprocessor of the handheld device. In some embodiments, the user device can be further adapted to log and report patient noncompliance and safety events.

The disclosed subject matter also provides techniques for subcutaneously implanting a distraction device in a patient to opposing bony fragments of a bone and using such a device. In some embodiments, a handheld device is programmed with one or more distraction parameters and magnetically coupled with the distraction device such that rotation of a magnetic element of the handheld device causes corresponding rotation of a magnetic element of the distraction device. The handheld device can be initiated such that the magnetic element of the handheld device rotates based on the one or distraction parameters.

In some embodiments, the handheld device can confirm that distraction is occurring according to predetermined time parameters. In some embodiments, the handheld device can monitor user compliance with the one or more distraction parameters and can report user noncompliance to a patient physician.

In some embodiments, the disclosed subject matter can include turning a screw on the handheld device to adjust the distance between the magnetic element of the handheld device relative to the magnetic element of the distraction device. In some embodiments, the disclosed subject matter can include monitoring the distance of distraction, wherein the handheld device terminates distraction if the distance of distraction exceeds or is about to exceed the maximum distance of distraction set forth by the distraction parameters. In some embodiments, the distance of distraction can be determined by counting the number of rotations of the magnetic element of the distraction device.

In some embodiments, the disclosed subject matter can include monitoring a speed of distraction, wherein the speed is adjusted if it does not fall within the one or more distraction parameters and/or distraction is terminated if the speed of distraction fails to comply with the distraction parameters. In some embodiments, the disclosed subject matter can include monitoring a rate of distraction, wherein a detection of a sudden change in the rate causes an alarm. In some embodiments, the disclosed subject matter can include monitoring a torque applied to the magnetic element of the handheld device, wherein a detection of a sudden change in the torque or an increased total torque causes an alarm.

The accompanying drawings, which are incorporated and constitute part of this disclosure, illustrate its embodiments and serve to explain its principles.

Figure 1:
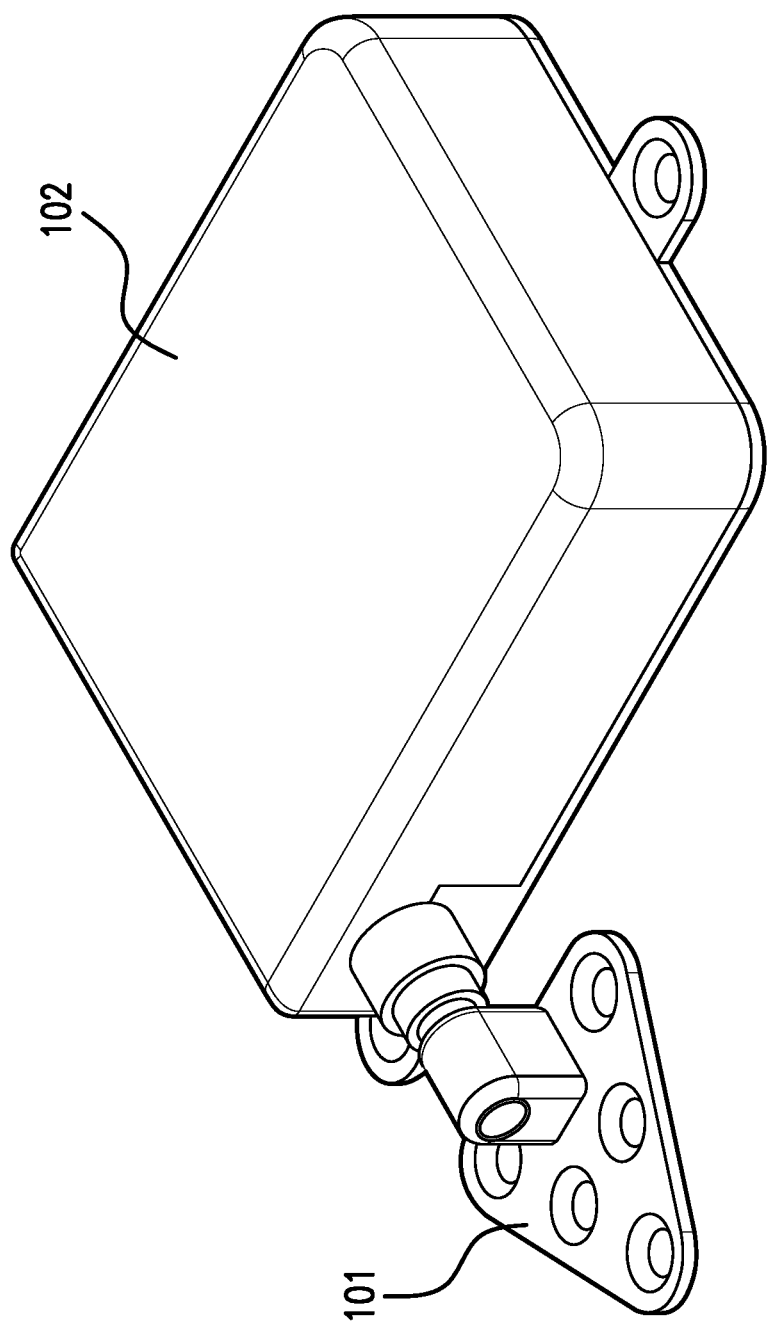
FIG. 1 is a diagram of a distraction device for a system of distraction in accordance with some embodiments of the disclosed subject matter.

Throughout the drawings, the same reference numerals and characters, unless otherwise stated, are used to denote like features, elements, components or portions of the illustrated embodiments. Moreover, while the present invention will now be described in detail with reference to the Figs., it is done so in connection with the illustrative embodiments.

DETAILED DESCRIPTION

Techniques for cranio-maxillo-facial distraction are presented. A distraction device is attached to opposing bony fragments and subcutaneously implanted in a patient. The distraction device has a distraction element and a magnetic element. The distraction element is attached to the bony fragments and performs distraction osteogenesis by separating the bony fragments. A handheld device is used to operationally couple the magnetic element of the distraction device. The handheld device can include a magnetic element, a motor, and a microprocessor. The microprocessor uses distraction parameters to control the motor, which rotates the magnetic element of the handheld device. As the magnetic element of the handheld device rotates, the magnetic element of the distraction device also rotates. The rotation of the magnetic element of the distraction device controls the distraction element as it separates the bony fragments.

Figure 2:
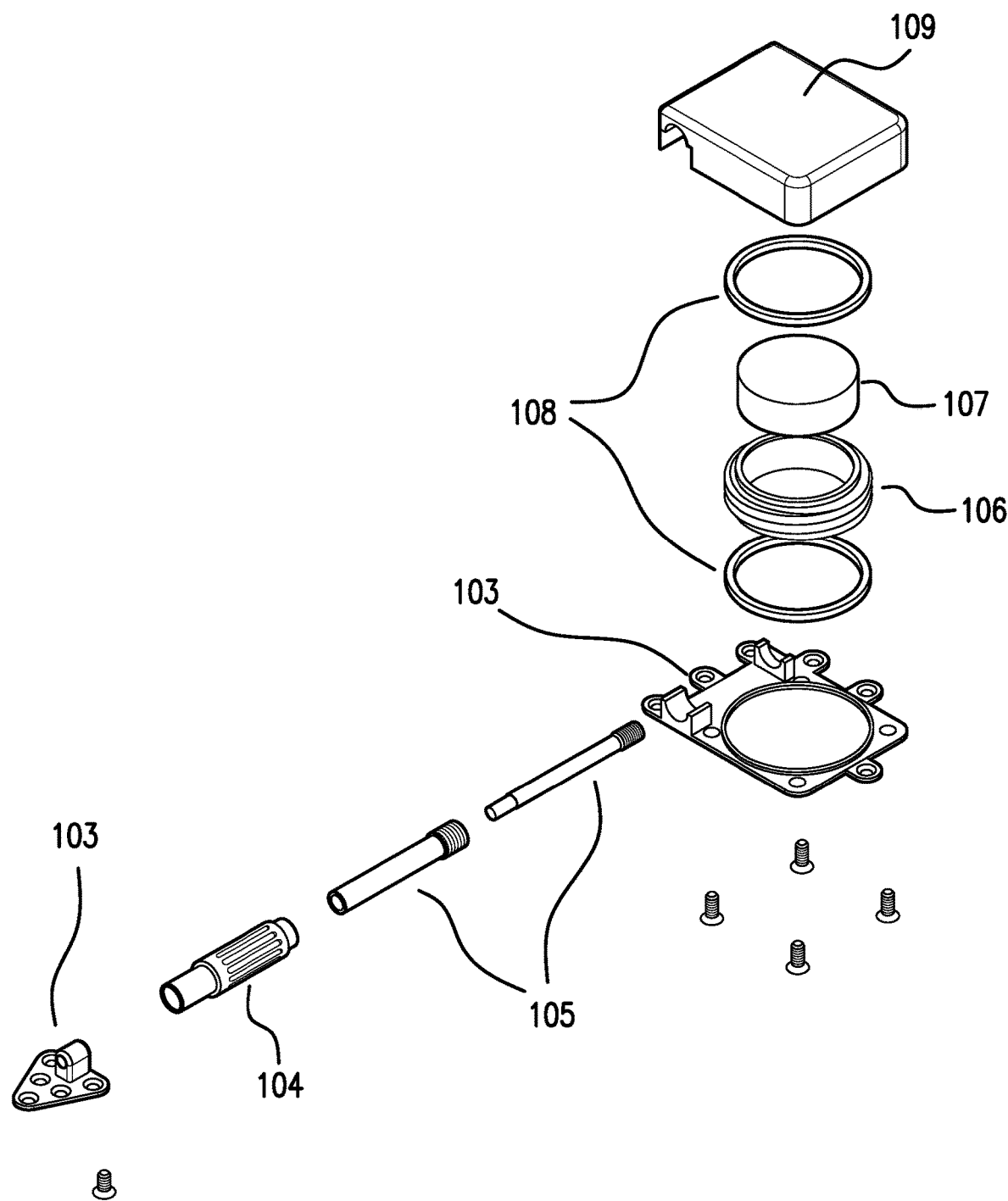
FIG. 2 is an assembly diagram of a distraction device for a system of distraction in accordance with some embodiments of the disclosed subject matter.

FIGS. 1-2 are diagrams of an example distraction device for a system of cranio-maxillo-facial distraction in accordance with some embodiments of the disclosed subject matter. The distraction device can be subcutaneously implanted in a patient. The distraction device can include a distraction element 101 and a rotatable magnetic element 102. The distraction element 101 can be any implantable rigid material. For example, the distraction element 101 can be stainless steel or titanium. The magnetic element 102 can be any size so long as it is small enough for implantation and big enough to generate torque required to expand the bony segments. For example, the magnetic element 102 can be a 12 mm magnet that generates 0.83 inch-pounds of torque.

Figure 3:
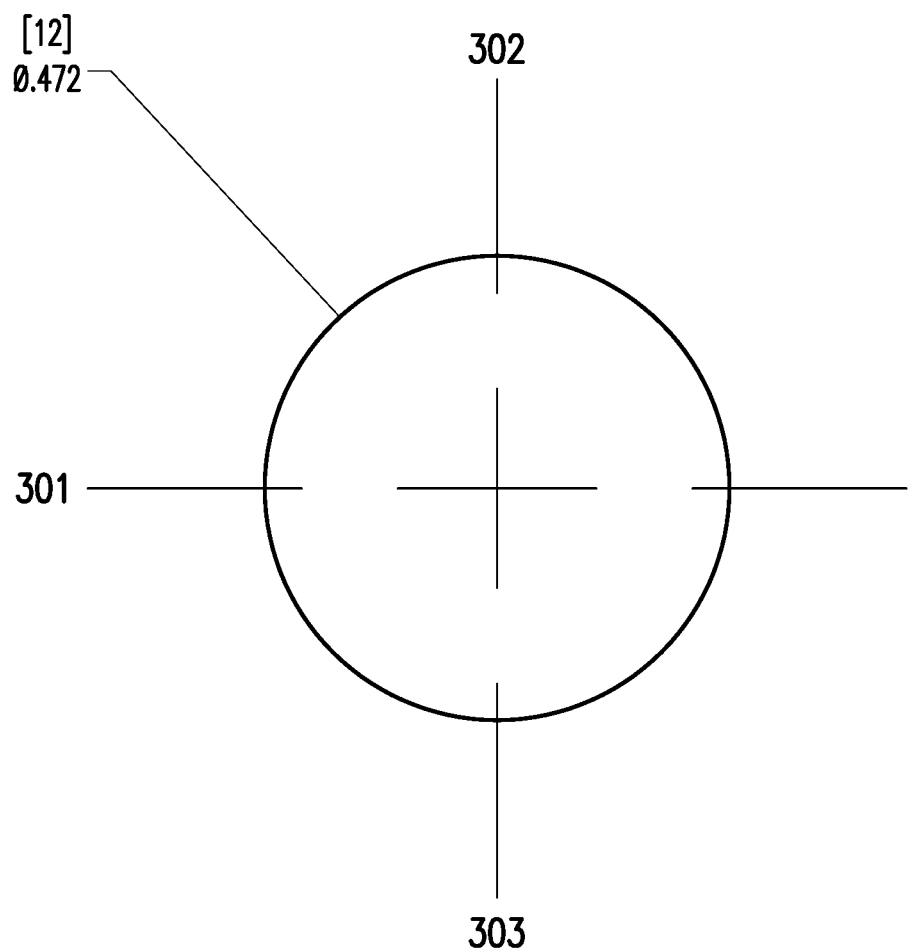
FIG. 3 depicts an exemplary magnetic element of a distraction device for a system of distraction in accordance with some embodiments of the disclosed subject matter.

FIG. 3 depicts an exemplary magnetic element of a distraction device with diametric magnetic poles. A diametrically-poled magnet is magnetized across its diameter 301 such that the north pole 302 and the south pole 303 are located on opposite sides of the diameter 301. A diametrically-poled magnet can allow the magnetic element 102 to rotate about its geometric axis. In some embodiments, the magnetic element 102 can be configured to generate more torque than a simple magnetic coupler which alternates magnet polarity in the configuration of a pie.

The distraction element 101 can attach to opposing bony fragments of a bone and perform distraction osteogenesis on the bone. The magnetic element 102 can be coupled to the distraction element 101 such that the rotation of the magnetic element 102 controls the distraction element. The distraction element 101 can include bony footplates 103, a drive shaft 104, a worm 105, and a gear 106. The magnetic element can include a magnet 107, a magnetic cover 108 and a magnetic housing 109. As the magnet 107 rotates, it can turn the gear 106. The gear 106 can transfer its torque to the worm 105, which can rotate the drive shaft 104. The drive shaft can separate the bony footplates 103, thereby increasing the separation between the opposing bony fragments so distraction osteogenesis can occur. The bony footplates 103 can be composed of resorbable material such that the distraction device can be removed. In some embodiments, the distraction element can perform distraction of about 1 to 2 millimeters per day.

In some embodiments, the distraction device can include an electronic element, communicatively coupled to the microprocessor of the handheld device. The electronic element can count one or more rotations of the rotatable magnetic element, thereby determining a distance of distraction. For example, the electronic element can be an NFC RFID tag. The NFC RFID tag can detect interruptions in the magnetic field caused by a ferrite strip on the south pole of the magnetic element. Each interruption corresponds to a rotation of the magnetic element of the distraction device.

Figure 4:
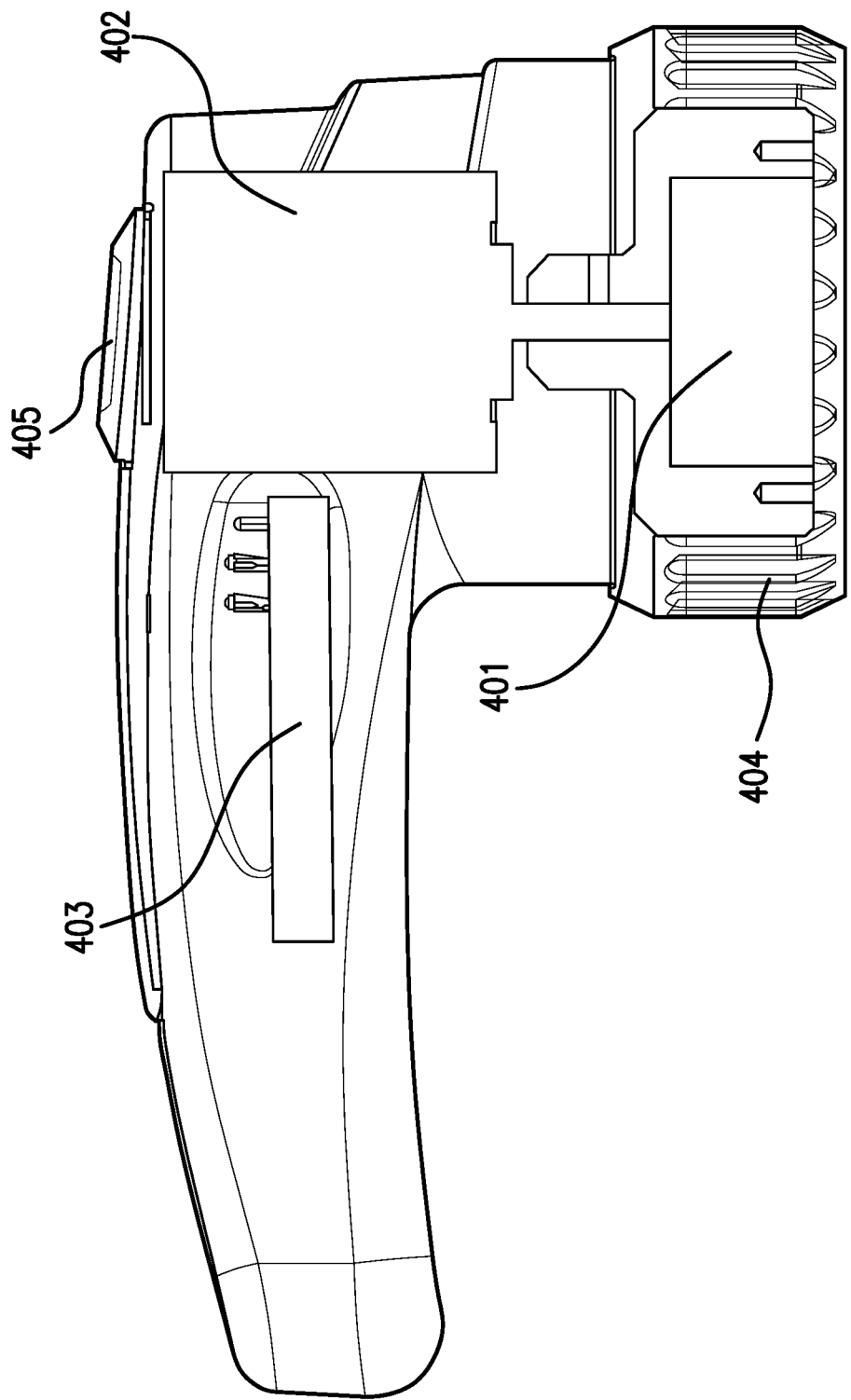
FIG. 4 is a diagram of a handheld device for a system of cranio-maxillo-facial distraction in accordance with some embodiments of the disclosed subject matter.

FIG. 4 is a diagram of an example handheld device for a system of cranio-maxillo-facial distraction in accordance with some embodiments of the disclosed subject matter. The handheld device can be used by the patient. The handheld device can include a magnetic element 401, a motor 402, and a microprocessor 403.

The magnetic element 401 can operationally couple to and magnetically align with the with the magnetic element 102 of the distraction device such that rotation of the magnetic element 401 of the handheld device causes corresponding rotation of the magnetic element 102 of the distraction device. In some embodiments, the handheld device can be mounted on a steel base to increase the magnitude of magnetic field generated by the magnetic element 401. In some embodiments, the magnetic element 401 can be configured to preserve torque-generating capabilities when there is magnetic misalignment with the magnetic element 102 of the distraction device.

Figure 5:
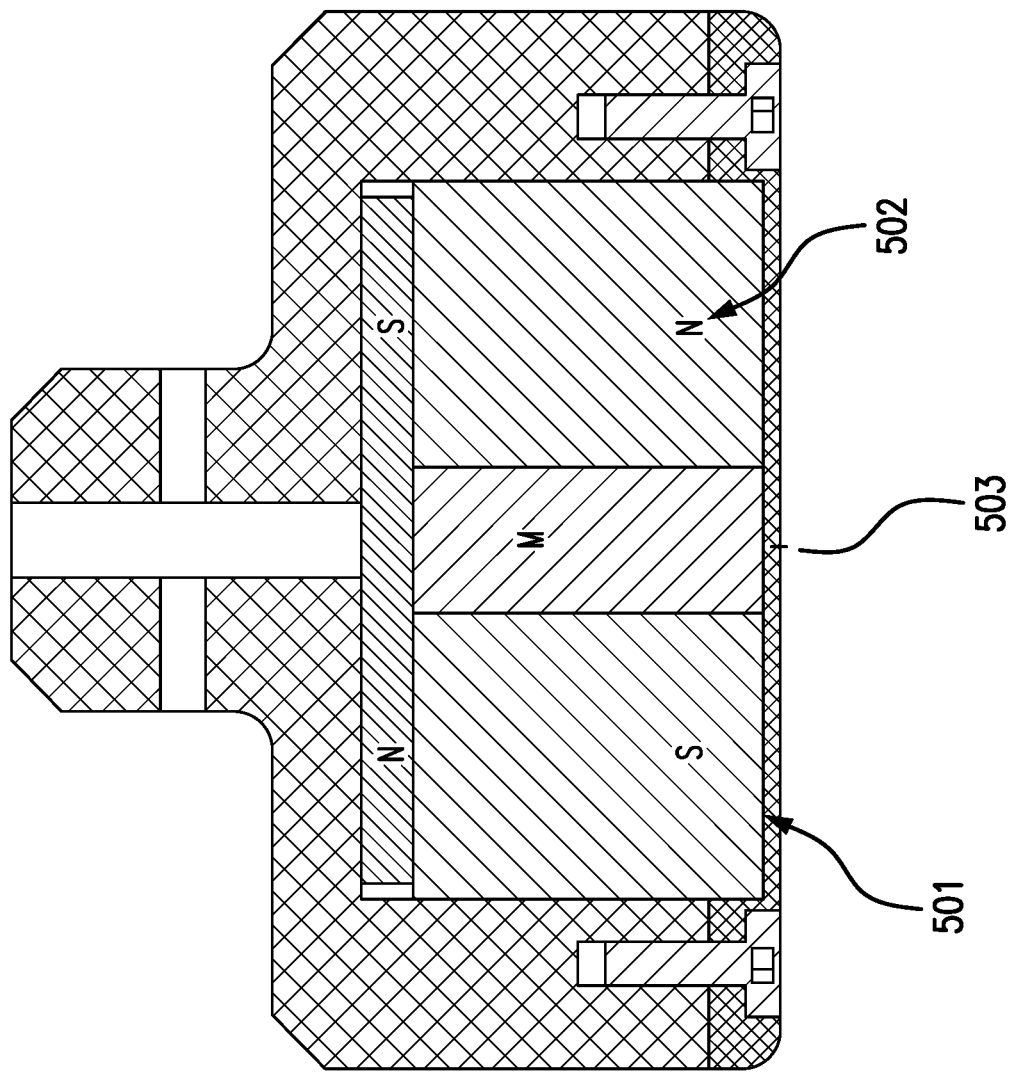
FIG. 5 depicts an exemplary magnetic element of a handheld device for a system of distraction in accordance with some embodiments of the disclosed subject matter.

FIG. 5 depicts an exemplary magnetic element of a handheld device comprising at least two magnets. A first magnet 501 and a second magnet 502 are configured to have opposite polarities. The first magnet 501 is configured such that the north or south pole is at a distal end 503 of the magnetic element. A second magnet 502 is configured such that the opposite polarity of the first magnet 501 is at the distal end 503 of the magnetic element. For example, the first magnet 501 can have a south pole and the second magnet 502 can have a north pole at the distal end 503 of the magnetic element, or vice versa. In some embodiments, the magnetic element can further comprise a third magnet, adapted for placement between the first magnet 501 and second magnet 502. The third magnet can be coupled to the first magnet and the second magnet and can rotate such that the first magnet and the second magnet rotate around the third magnet. The opposing polarities of the magnetic element 401 can rotate a magnetic element 102 of the distraction device that is diametrically poled.

The motor 402 can be coupled to the magnetic element 401 of the handheld device such that the motor 402 rotates the magnetic element 401 of the handheld device. In some embodiments, the number of motor rotations can correspond to a distance of distraction. For example, 34 motor rotations can correspond to 1 millimeter of distractor movement.

The microprocessor 403 can be electrically coupled to the motor 402 such that the microprocessor 403 controls the motor 402 based on distraction parameters. Distraction parameters can include magnetic alignment, a time for distraction, a distance of distraction, a speed of distraction, a rate of distraction, and a torque applied to the magnetic element of the handheld device.

A battery can be electrically coupled to the microprocessor 403. The battery can power the microprocessor 403 and motor 402, thereby allowing the magnetic element 401 to rotate.

In some embodiments, the handheld device can include a rotatable screw cap 404. The rotatable screw cap 404 can be turned to adjust the distance between the magnetic element of the handheld device relative to the magnetic element of the distraction device. In some embodiments, the rotatable screw cap 404 allows the user to place the handheld device on the skin overlying the implanted device as the screw cap 404 is rotated. In some embodiments, the handheld device can include at least one of a button 405 and a lever. The button 405 can be depressed and/or the lever can be released to initiate the magnetic element of the handheld device. Once the button 405 is depressed and/or the lever is released, it is communicated to the microprocessor 403 that distraction can be begin. The microprocessor 403 then starts the motor 402 based on the distraction parameters.

In some embodiments, the handheld device can include one or more light element and sound element, each adapted to alert the patient when distraction is scheduled to occur, one or more light element and sound element. The microprocessor 403 can include an internal clock. The clock can monitor when distraction is scheduled to occur based on the distraction parameters. When distraction is scheduled to occur, the microprocessor 403 can activate the light element and/or the sound element to alert the patient.

The light element can assist the patient in steering the handheld device into magnetic alignment with the distraction device. The microprocessor 403 can monitor the magnetic alignment between the handheld device and the distraction device. When magnetic alignment is achieved, the microprocessor 403 can activate the light element to notify the patient. The sound element can alert the patient when distraction is scheduled to occur and alert the patient as to any deviations from the distraction parameters. The microprocessor 403 can monitor the distraction parameters during distraction. The microprocessor can then activate the sound element to alert the patient of any deviation from the distraction parameters.

The system for cranio-maxillo-facial distraction can also include a user device (not shown). The user device can change and transmit distraction parameters to the microprocessor 403 and can log and report patient noncompliance and safety events. For example, the user can input updated distraction parameters in to a user device such as a smart phone or computer. The user device can then transmit the updated parameters to the microprocessor 403 through a wireless module such as Bluetooth or a wired module such as a USB.

Figure 6:
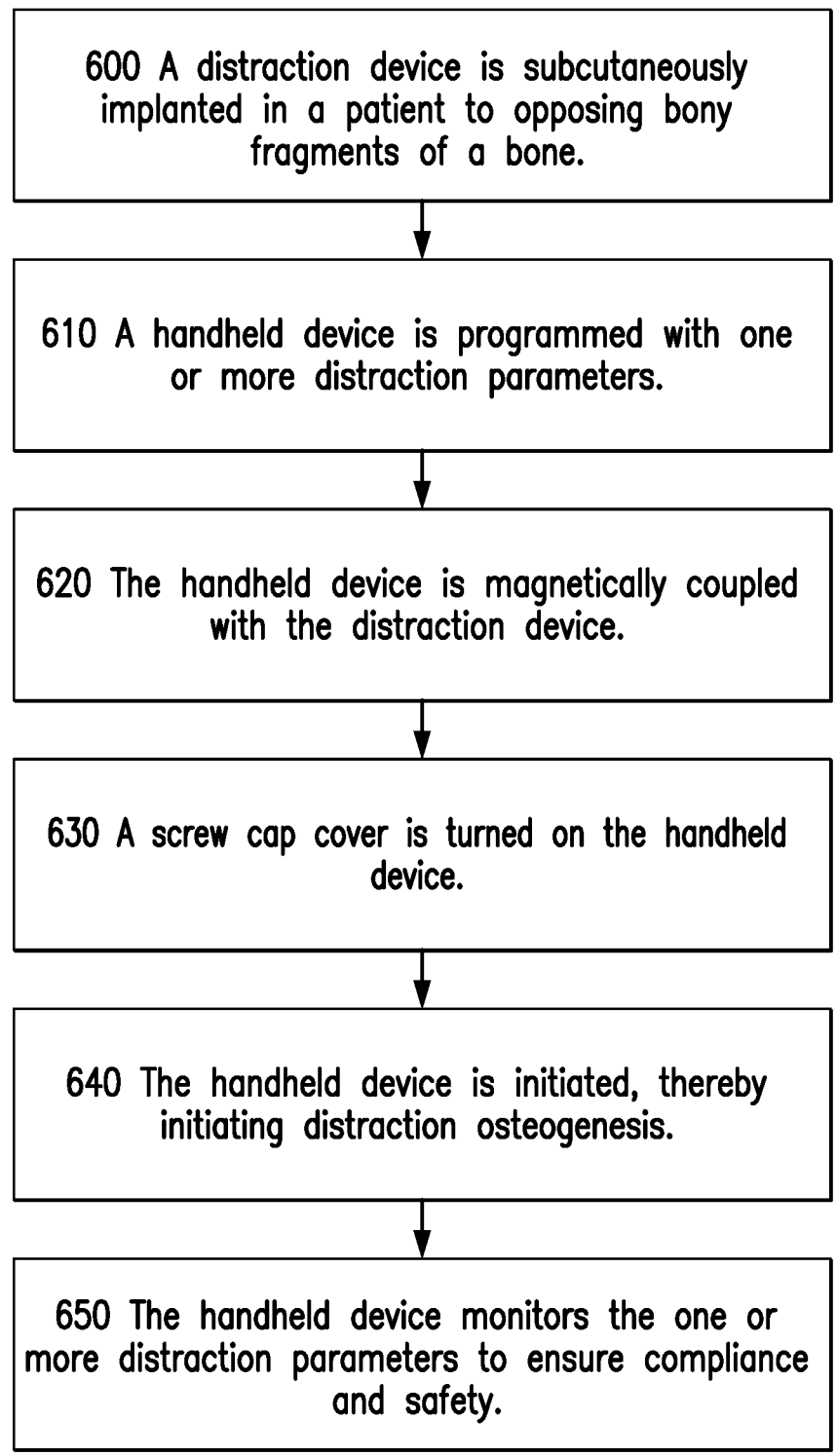
FIG. 6 is a diagram illustrating a method implemented in accordance with some embodiments of the disclosed subject matter.

FIG. 6 is a diagram illustrating a method implemented in accordance with some embodiments of the disclosed subject matter. The method can be implemented on the system of FIGS. 1-2. At 600, a distraction device can be subcutaneously implanted in a patient. The distraction device can be attached to opposing bony fragments of a bone and perform distraction osteogenesis on the bone. At 610, one or more distraction parameters can be programmed into a handheld. This can involve a physician programming a handheld device with distraction parameters or a patient programming updated distraction parameters to the handheld device.

At 620, the handheld device can magnetically couple with the distraction device. Magnetic coupling allows rotation of a magnetic element of the handheld device to cause corresponding rotation of a magnetic element of the distraction device. At 630, a screw cap cover on the handheld device can be turned. The screw cap cover can adjust the distance between the magnetic element of the handheld device relative to the magnetic element of the distraction device. Turning the screw cap cover can protect the patient from excessive magnetic pull. The screw cap cover can be turned before or after the handheld device is placed on the skin overlying the implanted device.

At 640, the handheld device can be initiated. Initiation of the handheld device can rotate the magnetic element of the handheld device based on the distraction parameters. The rotation of the magnetic element of the handheld device causes corresponding rotation of the magnetic element of the distraction device. The rotation of the magnetic element of the distraction device can control the distance between the opposing bony fragments. As the opposing bony fragments are separated by the rotation of the magnetic element of the distraction device, distraction osteogenesis occurs.

At 650, the handheld device can monitor the distraction parameters. For example, the handheld device can monitor a distance of distraction and terminate distraction if the distance of distraction exceeds or is about to exceed the maximum distance of distraction set forth by the distraction parameters. For example, the handheld device can monitor a speed of distraction, adjust the speed if it does not fall within the distraction parameters, and terminate distraction if the speed of distraction fails to comply with the distraction parameters. For example, the handheld device can monitor a rate of distraction and cause an alarm when it detects a sudden change in the rate. For example, the handheld device can monitor a torque applied to the magnetic element of the handheld device and cause an alarm when it detects a sudden change in the torque or an increased total torque. 620-650 can be repeated as necessary to lengthen the bone.

In some embodiments, the handheld device can confirm that distraction is occurring according to predetermined time parameters before initiating the handheld device at 630. The handheld device can include an internal clock that monitors when distraction is scheduled to occur based on the distraction parameters. When distraction is initiated outside the predetermined time parameters, the handheld device can stop its initiation, thereby preventing distraction. In some embodiments, the handheld device can monitor user compliance with the one or more distraction parameters and can report user noncompliance to a patient physician.

Figure 7:
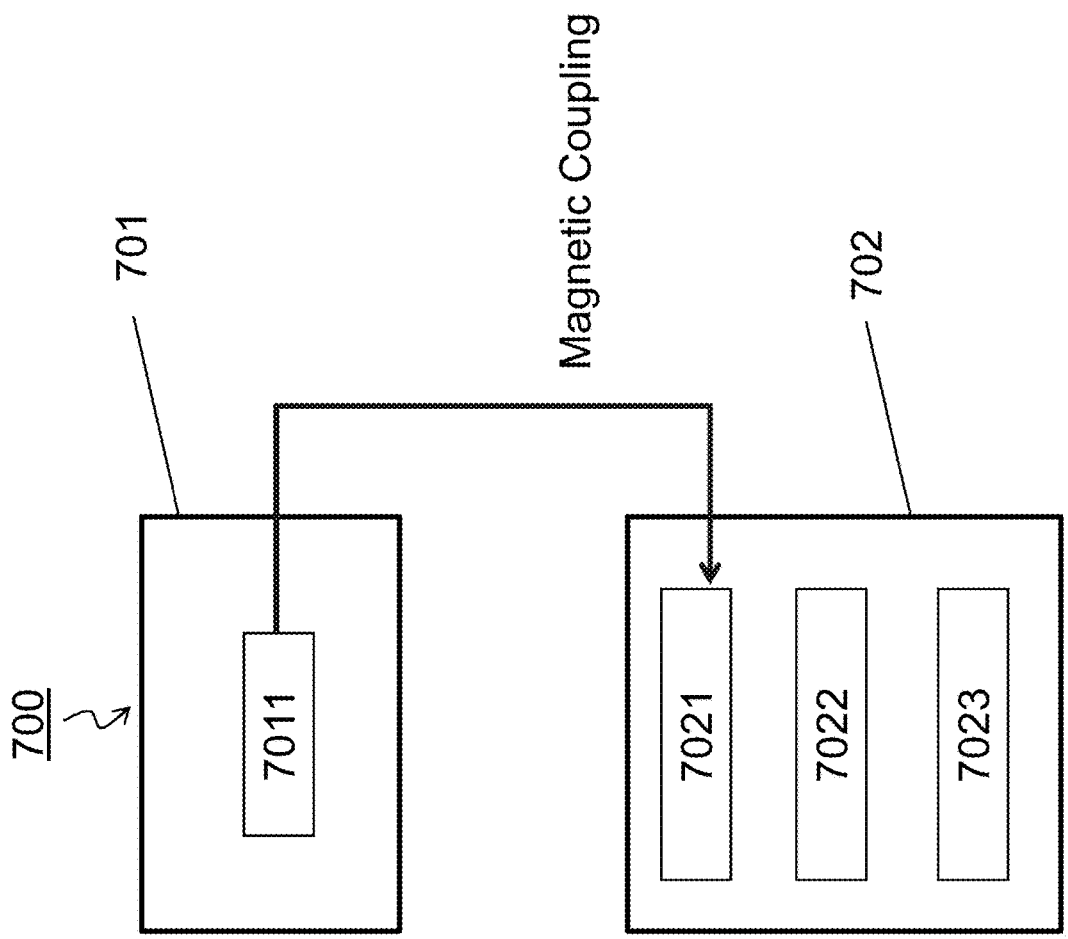
FIG. 7 is a diagram illustrating an implemented system in accordance with some embodiments of the disclosed subject matter.

With reference to FIG. 7, an exemplary system 700 for distraction of a bone in a patient can include a distraction device 702 and a handheld device 701. The distraction device 702 can include a distraction element 7022 and a rotatable magnetic element 7021. The handheld device 701 include a magnetic element 7011, operationally coupled to and magnetically aligned with the rotatable magnetic element 7021 of the distraction device 702, such that rotation of the magnetic element 7011 of the handheld device 701 causes corresponding rotation of the rotatable magnetic element 7021 of the distraction device 702. Further, the distraction device 702 include an electronic element 7023. The electronic element 7023 is adapted to count the one or more rotations of the rotatable magnetic element 7021 by detecting one or more interruptions in a magnetic field generated by the rotatable magnetic element 7021.

The foregoing merely illustrates the principles of the disclosed subject matter. Various modifications and alterations to the described embodiments will be apparent to those skilled in the art in view of the teachings herein. For example, the system can be employed for distraction osteogenesis throughout the body. For example, the system can be employed to prevent bone healing complications in small bones across the entire skeleton, wherein the distraction device can run in reverse to compress two bony segments rather than expand two bony segments. It will thus be appreciated that those skilled in the art will be able to devise numerous techniques which, although not explicitly described herein, embody the principles of the disclosed subject matter and are thus within its spirit and scope.

The invention claimed is:

1. A system for distraction of a bone in a patient, comprising:
  a distraction device, adapted for subcutaneous implantation in the patient, comprising:
    a distraction element, adapted to attach to opposing bony fragments of the bone and perform distraction osteogenesis on the bone;
    a rotatable magnetic element, coupled to the distraction element such that rotation of the rotatable magnetic element controls movement of the distraction element
    an electronic element, magnetically coupled to the rotatable magnetic element, wherein the electronic element is adapted to count the one or more rotations of the rotatable magnetic element by detecting one or more interruptions in a magnetic field generated by the rotatable magnetic element, wherein each interruption corresponds to a rotation of the rotatable magnetic element, and wherein a ferrite strip on the rotatable magnetic element is adapted to interrupt the magnetic field; and
  a handheld device, operationally coupled to the distraction device, comprising:
    a magnetic element, operationally coupled to and magnetically aligned with the rotatable magnetic element of the distraction device, such that rotation of the magnetic element of the handheld device causes corresponding rotation of the rotatable magnetic element of the distraction device, wherein the rotatable magnetic element is configured to rotate based on one or more distraction parameters.

2. The system of claim 1, wherein the handheld device further comprises a rotatable screw cap, wherein rotation thereof adjusts a distance between the magnetic element of the handheld device relative to the rotatable magnetic element of the distraction device.

3. The system of claim 1, wherein the handheld device further comprises at least one of a button and a lever, adapted to initiate the magnetic element of the handheld device.

4. The system of claim 1, wherein the electronic element is communicatively coupled to a microprocessor of the handheld device, wherein the electronic element is adapted to count one or more rotations of the rotatable magnetic element, thereby determining a distance of distraction.

5. The system of claim 1, further comprising a microprocessor, configured to control rotation of the magnetic element of the handheld device based on the one or more distraction parameters.

6. The system of claim 1 wherein the handheld device is further adapted to log and report patient noncompliance and safety events.

7. The system of claim 1, further comprising a motor coupled to the magnetic element of the handheld device, for causing rotation thereof.

8. The system of claim 1, wherein the magnetic element of the handheld device is configured to preserve torque-generating capabilities when there is magnetic misalignment with the rotatable magnetic element of the distraction device.

9. The system of claim 1, wherein the rotatable magnetic element of the distraction device is configured to be diametrically poled, wherein the magnetic element of the handheld device comprises at least two magnets, wherein a first magnet and a second magnet are configured to have opposite polarities.

* * * * *